United States Patent [19]

Watanabe

[11] Patent Number: 5,311,342
[45] Date of Patent: May 10, 1994

[54] LIQUID CRYSTAL DISPLAY DEVICE WITH PARTICULAR COMMON ELECTRODE CONNECTOR

[75] Inventor: Takahiko Watanabe, Tokyo, Japan

[73] Assignee: Nec Corporation, Japan

[21] Appl. No.: 966,692

[22] Filed: Oct. 26, 1992

[30] Foreign Application Priority Data

Nov. 6, 1991 [JP] Japan .................................. 3-289569

[51] Int. Cl.⁵ ............................................ G02F 1/1343
[52] U.S. Cl. ........................................ 359/88; 257/691
[58] Field of Search ..................... 359/88, 87, 59, 54; 257/691

[56] References Cited

U.S. PATENT DOCUMENTS

| | | | |
|---|---|---|---|
| 4,457,589 | 7/1984 | Tamura et al. | 359/88 |
| 4,969,718 | 11/1990 | Noguchi et al. | 359/54 |

FOREIGN PATENT DOCUMENTS

| | | | |
|---|---|---|---|
| 57-52027 | 3/1982 | Japan | 359/88 |
| 64-2019 | 1/1989 | Japan | 3259/59 |
| 4-159520 | 6/1992 | Japan | 359/87 |

OTHER PUBLICATIONS

"Sealing Structure for Liquid Crystal Display", IBM Technical Disclosure Bulletin, vol. 32, No. 5a, Oct. 1989, pp. 223-224.

*Primary Examiner*—William L. Sikes
*Assistant Examiner*—Ron Trice
*Attorney, Agent, or Firm*—Laff, Whitesel, Conte, Saret

[57] ABSTRACT

A liquid crystal display substrate includes a first substrate, a second substrate, terminals, and a conductive region. The first substrate has a large number of pixel electrodes arranged in a matrix. The second substrate is arranged to be opposite to the first substrate and to interpose a liquid crystal with the first substrate and has a counter electrode for performing liquid crystal display by a voltage applied across said pixel electrodes and the counter electrode. The terminals include common electrode terminals arranged at one part of a peripheral portion of the first substrate. The conductive region is formed at a part of the peripheral portion in which the terminals of the first substrate are not formed, and the conductive region is connected to at least one of the common electrode terminals to apply a common potential to the counter electrode. A liquid crystal display device using the above liquid crystal display substrate is also disclosed.

6 Claims, 2 Drawing Sheets

LIQUID CRYSTAL DISPLAY DEVICE WITH PARTICULAR COMMON ELECTRODE CONNECTOR

BACKGROUND OF THE INVENTION

The present invention relates to a liquid crystal display substrate and a liquid crystal display device using an active matrix scheme and, more particularly, to a liquid crystal display substrate and a liquid crystal display device having a simplified circuit arrangement of a thin film transistor (to be referred to as a TFT) substrate.

FIG. 2 shows an equivalent circuit of a conventional liquid crystal display substrate using an active matrix scheme, and FIG. 3 shows the section of a main part of the conventional liquid crystal display substrate.

In FIGS. 2 and 3, reference numeral 21 denotes a liquid crystal display substrate arranged as follows. That is, a plurality of row terminals 24, common electrode terminals 23a and 23b, a plurality of column terminals 22, and common electrode terminals 23c and 23d are arranged on two adjacent sides of the liquid crystal display substrate 21, common electrode terminals 23e and 23f are arranged on one of the remaining sides, and pixel electrodes 36 and TFTs 37 for switching the pixel electrodes 36 are arranged in a matrix at cross points between lines 24a of the row terminals 24 and lines 22a of the column terminals 22. Reference numeral 25 denotes a first drive circuit substrate to which the plurality of row terminals 24 and the common electrode terminals 23a and 23b are connected. Reference numeral 26 denotes a second drive circuit substrate to which the plurality of column terminals 22 and the common electrode terminals 23c and 23d are connected. Reference numeral 27 denotes a third drive circuit substrate to which the common electrode terminals 23e and 23f are connected. Reference numerals 28 denote common electrode transfer pads arranged at the four corners of the liquid crystal display substrate 21. A display unit 29 is constituted by the large number of pixel electrodes 36 arranged in a matrix. In FIG. 3, a counter substrate 30 constitutes one of a pair of substrates constituting the liquid crystal display substrate 21, a TFT substrate 31 is arranged to interpose a liquid crystal 35 with the counter substrate 30 so as to oppose the counter substrate 30, and transparent electrodes 32 (to be referred to as counter electrodes) are formed on the counter substrate 30. The counter electrodes 32 of the counter substrate 30 are connected to the transfer pads 28 through silver paste portions 34, and the transfer pads 28 are connected to storage electrodes (not shown) on the TFT substrate 31.

As described above, the large number of square pixel electrodes 36 are formed on the TFT substrate 31 in a matrix, and each of the TFTs 37 is formed at one notched corner of each of the pixel electrodes 36. In addition, the lines 24a of the row terminals 24 and the lines 22a of the column terminals 22 are stacked and wired in a matrix to partition the pixel electrodes 36.

In the conventional liquid crystal display substrate with the above arrangement, the transparent electrodes 32 of the counter substrate 30 connected to the common electrode terminals 23a to 23f through the silver paste portions 34, the transfer pads 28, and the storage electrodes are driven as a common electrode.

The liquid crystal display substrate is driven as follows. As shown in FIG. 2, the row terminals 24 and the common electrode terminals 23a and 23b are connected to the first drive circuit substrate 25, the column terminals 22 and the common electrode terminals 23c and 23d are connected to the second drive circuit substrate 26, and the common electrode terminals 23e and 23f are connected to the third drive circuit substrate 27.

As described above, when the terminals are connected to the drive circuit substrates 25, 26, and 27, the common electrode is driven from the four corners of the liquid crystal display substrate 21, the transient response characteristics of a common electrode potential in the display unit 29 can be assured to obtain the display performance of the display unit 29.

In the above conventional liquid crystal display substrate, since the common electrode must be driven at the four corners of the liquid crystal display substrate to assure the display performance, the number of column data lines is small. As shown in FIG. 2, even when a data signal can be driven such that the liquid crystal display substrate is connected to one side of each of the drive circuit substrates, three drive circuit substrates, i.e., a row drive circuit substrate, a column (data) drive circuit substrate, and a common electrode drive circuit substrate must be connected to the liquid crystal display substrate.

SUMMARY OF THE INVENTION

It is an object of the present invention to provide a liquid crystal display substrate and a liquid crystal display device capable of reducing the number of drive substrates connected to the liquid crystal display substrate.

It is another object of the present invention to provide an inexpensive liquid crystal display substrate and an inexpensive liquid crystal display.

In order to achieve the above objects, according to the present invention, there is provided a liquid crystal display substrate comprising a first substrate having a large number of pixel electrodes arranged in a matrix, a second substrate arranged to be opposite to the first substrate and to interpose a liquid crystal with the first substrate and having a counter electrode for performing liquid crystal display by a voltage applied across the pixel electrodes and the counter electrode, terminals including common electrode terminals arranged at one part of a peripheral portion of the first substrate, and a conductive region formed at a part of the peripheral portion in which the terminals of the first substrate are not formed, the conductive region being connected to at least one of the common electrode terminals to apply a common potential to the counter electrode.

DESCRIPTION OF THE PREFERRED EMBODIMENT

The present invention will be described below with reference to the accompanying drawings.

Figure 1:
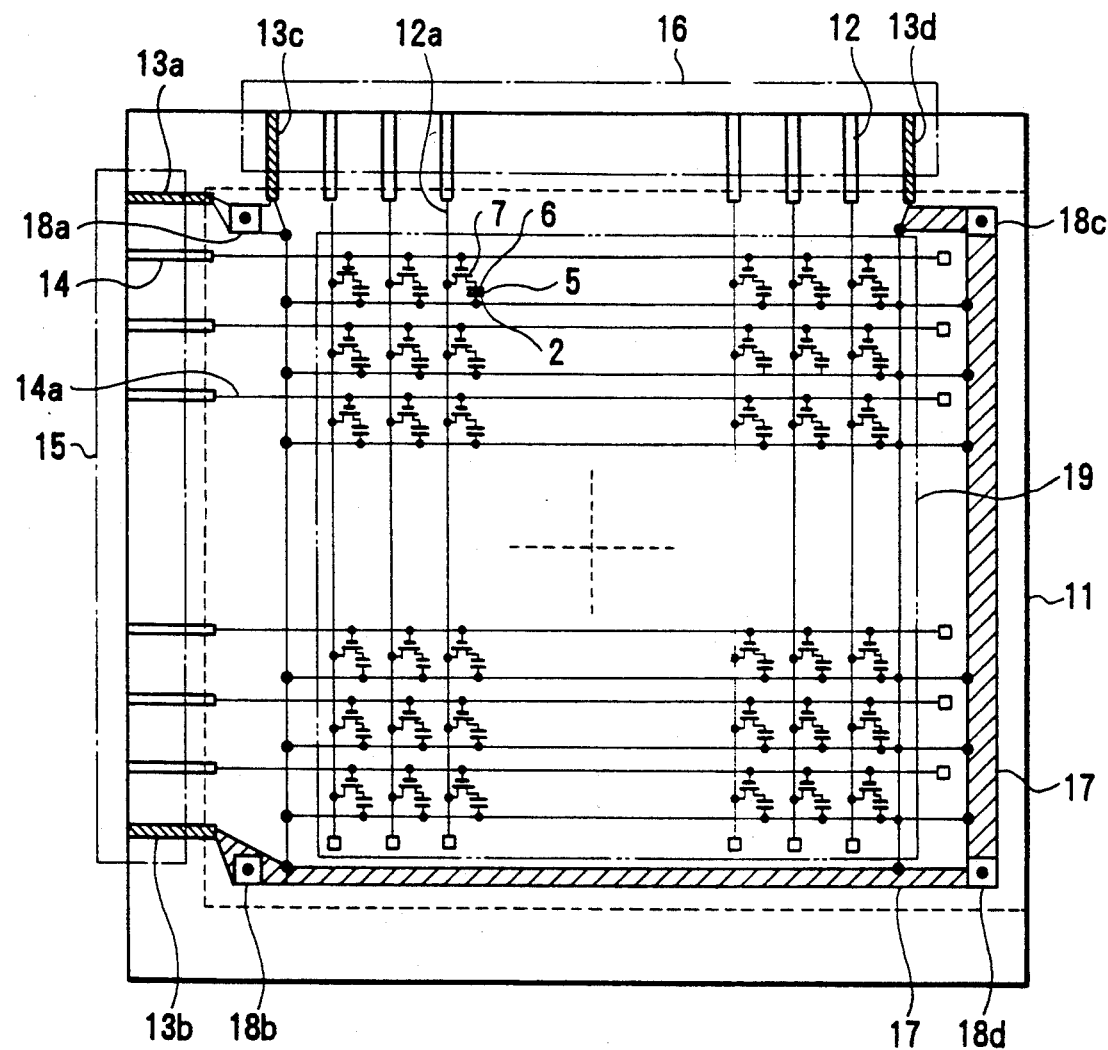
FIG. 1 is a view showing an equivalent circuit of a liquid crystal display substrate according to an embodiment of the present invention.
Figure 2:
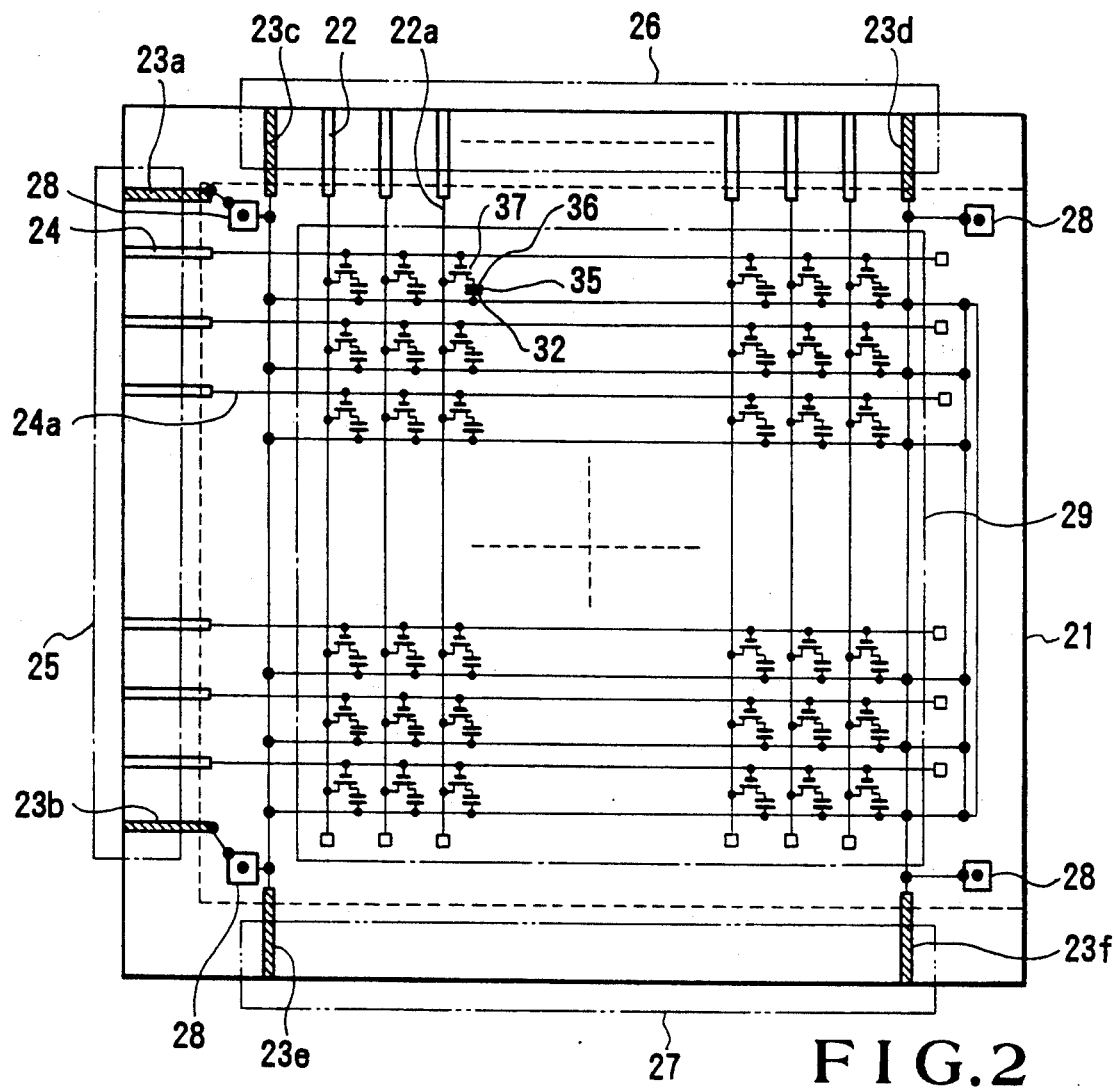
FIG. 2 is a view showing an equivalent circuit of a conventional liquid crystal display substrate.

FIG. 1 shows an equivalent circuit of a liquid crystal display substrate according to an embodiment of the present invention.

Figure 3:
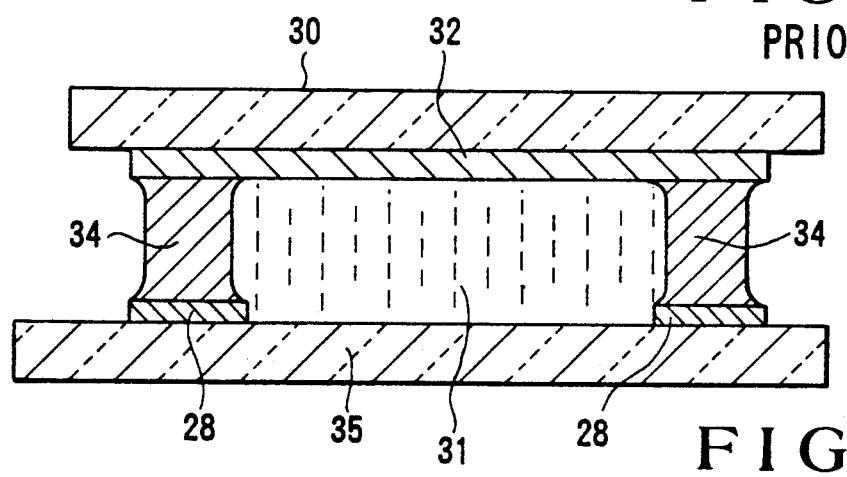
FIG. 3 is a sectional view showing the main part of the conventional liquid crystal display substrate.

In FIG. 1, reference numeral 11 denotes a liquid crystal display substrate arranged as follows. That is, a plurality of row terminals 14, common electrode terminals 13a and 13b, a plurality of column terminals 12, and common electrode terminals 13c and 13d are arranged on two adjacent sides of the liquid crystal display substrate 11, and pixel electrodes 6 and TFTs 7 for switching the pixel electrodes 6 are arranged in a display unit 19 in a matrix at cross points between lines 14a of the row terminals 14 and lines 12a of the column terminals 12. As in FIG. 3, the liquid crystal display substrate 11 is constituted by a TFT substrate and a counter substrate which interpose a liquid crystal 5 therebetween and each of which consists of a glass substrate. Reference numeral 15 denote a first drive circuit substrate to which the plurality of row terminals 14 and the common electrode terminals 13a and 13b are connected. Reference numeral 16 denotes a second drive circuit substrate to which the plurality of column terminals 12 and the common electrode terminals 13c and 13d are connected. Reference numerals 18a to 18d denote common electrode transfer pads arranged at the four corners of the liquid crystal display substrate 11 on the TFT substrate side and connected to a counter electrode 2 of the counter substrate. Reference numeral 17 denotes a bus line formed on the TFT substrate of the liquid crystal display substrate 11 along the remaining two sides to which the row terminals 14, the column terminals 12, and the common electrode terminals 13a to 13d are not led. The bus line 17 is connected to the common electrode terminals 13b and 13d through the connection positions of the two transfer pads 18b and 18c adjacent to the transfer pad 18d located at the corner formed by these two sides. The display unit 19 is constituted by the large number of pixel electrodes 6 arranged in a matrix.

The large number of square pixel electrodes 6 are arranged in a matrix on the TFT substrate constituting one substrate of the liquid crystal display substrate 11, each of the TFTs 7 is formed at one notched corner of each of the pixel electrodes 6. In addition, the lines (gate paths) 14a of the row terminals 14 and the lines (drain paths) 12a of the column terminals 12 are stacked and wired in a matrix to partition the pixel electrodes 6. On the other hand, the counter electrode 2 serving as a common electrode is formed on the counter substrate constituting the other substrate of the liquid crystal display substrate 11.

In the liquid crystal display substrate arranged as described above, when the first drive circuit substrate 15 is connected to the row terminals 14 and the common electrode terminals 13c and 13b of the liquid crystal display substrate 11, and the second drive circuit substrate 16 is connected to the column terminals 12 and the common electrode terminals 13c and 13d, the common electrode on the counter substrate side can be reliably driven from the positions of the transfer pads 18a to 18c except for the transfer pad 18d.

On the other hand, the bus line 17, both ends of which are connected to the common electrode terminals 13b and 13d, respectively, and which is formed in the space of the two sides to which the terminals of the liquid crystal display substrate 11 are not connected, consists of a metal such as Cr used in a process for manufacturing the liquid crystal display substrate 11. When the bus line 17 is formed by a Cr layer having, e.g., a width of 6 mm and a length of 230 mm, the resistance of the bus line 17 is about 30 Ω. This resistance is lower than the resistance of about 40 Ω of lead lines between the common electrode terminals 23a to 23f of the conventional liquid crystal display substrate 21, and the common electrode of the liquid crystal display 11 can be sufficiently driven. Therefore, the common electrode can be driven from the four corners of the liquid crystal display substrate 11 by the transfer pads 18a to 18c connected to the common electrode terminals 13a to 13d.

In this embodiment, although the bus line 17 is formed on the TFT substrate side of the liquid crystal display substrate 11, the bus line 17 may be formed between the transfer pads 18d and 18c and between the transfer pads 18d and 18c on the counter electrode side.

In addition, in the embodiment, the row terminals 14, the column terminals 12, and the common electrode terminals 13a to 13d are described as the terminals of the liquid crystal display substrate 11. However, the row terminals 14, the column terminals 12, and the common electrode terminals 13a to 13d may be described as the terminals of the first and second first drive circuit substrates 15 and 16.

As described above, according to the present invention, in a liquid crystal display substrate in which a data signal can be driven at one side of the liquid crystal display substrate, since the transient response characteristics of a common electrode is assured by arranging a metal bus line in the substrate, a common electrode drive substrate need not be connected to the liquid crystal display substrate. Therefore, the number of drive circuit substrates can be decreased, the connections of the substrates can be simplified, and the number of steps of connecting the substrates can be decreased, thereby reducing the production costs of the liquid crystal display substrate.

What is claimed is:
1. A liquid crystal display substrate comprising:
   a first and square substrate having a large number of pixel electrodes arranged in a matrix, a plurality of row terminals and common electrode terminals arranged on one side of two adjacent sides of said first substrate, a plurality of column terminals and common electrode terminals arranged on the other side of the two adjacent sides,
   a second substrate arranged to be opposite to said first substrate and to interpose a liquid crystal with said first substrate and having a counter electrode for performing a liquid crystal display in response to a voltage applied across said pixel electrodes and said counter electrode;
   a conductive region continuously formed along a peripheral portion of two remaining sides of said first substrate, said conductive region being connected to at least one of said common electrode terminals to apply a common potential to said counter electrode.
2. A substrate according to claim 1, wherein said common electrode terminals are arranged at both ends of each of sides of said first substrate, respectively, and said conductive region connects said common electrode terminals to each other which are diagonally arranged.
3. A substrate according to claim 1, wherein a plurality of connecting pads for applying a common potential to said counter electrode are arranged at four corners of said first substrate, and one of said connecting pads which is arranged at a corner formed by the two sides on which said conductive region is formed is connected to said conductive region.

4. A substrate according to claim 1, further comprising three-terminal switching elements for respectivley switching said pixel electrodes, such that an output terminal of each of said three-terminal switching elements if connected to each of said pixel electrodes, and said common potential is a ground potential applied to said counter electrodes via said conductive region.

5. A substrate according to claim 1, wherein said conductive region comprises a conductive film used in a process for manufacturing a liquid crystal display substrate consisting of said first and second substrate.

6. A liquid crystal display device comprising:
a first square substrate having a large number of pixel electrodes arranged in a matrix;
a second substrate arranged to be opposite to said first substrate and to interpose a liquid crystal with said first substrate and having a counter electrode for performing liquid crystal display by a voltage applied across said pixel electrodes and said counter electrode;
first terminals including row terminals and common electrode terminals arranged on one side of said first substrate;
second terminals including column terminals and common electrode terminals arranged on a side adjacent to the side on which said first terminals are arranged;
a conductive region continuously formed along two remaining sides of said first substrate on which said first and second terminals are not arranged, said conductive region being connected to at least one of said common electrode terminals to apply a common potential to said counter electrode;
a row terminal drive circuit substrate, connected to said first terminals, for supplying a row drive signal and a common potential to said first substrate; and
a column terminal drive circuit substrate, connected to said second terminals, for supplying a column drive signal and a common potential to said first substrate.

* * * * *